(12) United States Patent
Huang et al.

(10) Patent No.: US 12,110,667 B2
(45) Date of Patent: Oct. 8, 2024

(54) BASIN FAUCET WITH FILTER

(71) Applicant: XIAMEN DELMEI SANITARY WARE CO., LTD., Xiamen (CN)

(72) Inventors: Lengjie Huang, Quanzhou (CN);
Chunhua Wang, Xiamen (CN);
Changzheng Ni, Xiamen (CN);
Yongqiang Yan, Fuzhou (CN)

(73) Assignee: XIAMEN DELMEI SANITARY WARE CO., LTD., Xiamen (CN)

( * ) Notice: Subject to any disclaimer, the term of this patent is extended or adjusted under 35 U.S.C. 154(b) by 199 days.

(21) Appl. No.: 17/902,925

(22) Filed: Sep. 5, 2022

(65) Prior Publication Data
US 2023/0399827 A1 Dec. 14, 2023

(30) Foreign Application Priority Data
Jun. 13, 2022 (CN) .......................... 202221495649.1

(51) Int. Cl.
| | | |
|---|---|---|
| *E03C 1/04* | (2006.01) | |
| *B01D 36/02* | (2006.01) | |
| *C02F 1/00* | (2023.01) | |
| *C02F 1/28* | (2023.01) | |
| *C02F 1/30* | (2023.01) | |

(52) U.S. Cl.
CPC ............ *E03C 1/0404* (2013.01); *B01D 36/02* (2013.01); *C02F 1/001* (2013.01); *C02F 1/283* (2013.01); *C02F 1/285* (2013.01); *C02F 1/305* (2013.01)

(58) Field of Classification Search
CPC ....... E03C 1/0404; B01D 36/02; C02F 1/001; C02F 1/283; C02F 1/285; C02F 1/305; C02F 1/003; C02F 2307/06; Y02A 20/20
See application file for complete search history.

(56) References Cited

U.S. PATENT DOCUMENTS

| | | | | |
|---|---|---|---|---|
| 4,107,046 A | * | 8/1978 | Corder | C02F 1/003 210/433.1 |
| 5,273,650 A | * | 12/1993 | Vermes | E03B 7/074 210/264 |
| 6,267,887 B1 | * | 7/2001 | Hughes | C02F 1/003 210/443 |
| 7,690,623 B2 | * | 4/2010 | Parsons | E03C 1/057 137/624.11 |
| 2018/0298595 A1 | * | 10/2018 | Eads | E03C 1/0407 |
| 2020/0263806 A1 | * | 8/2020 | Kao | E03C 1/08 |

FOREIGN PATENT DOCUMENTS

WO WO-2013182012 A1 * 12/2013 ............. B01D 39/18

* cited by examiner

*Primary Examiner* — Patrick C Williams

(57) ABSTRACT

A basin faucet with filter includes a faucet tube base, a faucet cover, and a filtering device. The faucet tube base is provided with a water outlet channel and a switch mechanism for controlling conduction state of the water outlet channel. The faucet cover is detachably arranged on the faucet tube base, a side of the faucet cover is provided with an annular engaging groove, and a center surrounding by the annular engaging groove forms a water passing hole. The filtering device is detachably arranged on the faucet cover and is located between the switch mechanism and the water outlet channel. The filtering device includes a tubular filter core and a sealing member matching with an open end of the tubular filter core. Two ends of the tubular filter core are respectively fixed with the annular engaging groove and the sealing member.

8 Claims, 4 Drawing Sheets

BASIN FAUCET WITH FILTER

CROSS-REFERENCE TO RELATED APPLICATIONS

This application is based upon and claims priority to Chinese Patent Applications No. 202221495649.1, filed on Jun. 13, 2022, the entire contents of which are incorporated herein by reference.

TECHNICAL FIELD

The present disclosure relates to the technical field of faucets, in particular to a basin faucet with filter.

BACKGROUND

Although the tap water for daily use has been sterilized and disinfected in water plant before distribution, water transported by pipeline used for years is susceptible to secondary contamination due to rust residue and impurities of large particle size produced in the pipeline. Further, the tape water may also contain chlorine residuals, which can inactivate natural livings such as algae and bacteria by penetrating through the cell wall and oxidizing its enzyme system (enzyme is a biological catalyst), so that the bacteria are killed as their vital activities are interrupted. Chlorine residuals also pose seriously problems to human health as it can cause hair dryness, breakage, and split ends, and also can cause skin bleaching, skin peeling off, and extremely itchy skin irritation. Therefore, it is important to purify the tape water before use.

However, at present, the commercially available basin faucets mainly use external filters, which occupy a huge installation space, and problems such as leakage or falling off of the filters due to excessive water pressure emerge frequently, thereby leading to inconvenience. In addition, in some circumstances, the filter is directly embedded inside the basin faucet, and the filter needs to be replaced to ensure a good filtering effect after the faucet is used for a period of time. Additionally, such structure is troublesome to install, and it is difficult to replace the filter by home users themselves, causing inconvenience to the users.

SUMMARY OF THE DISCLOSURE

One objective of the present disclosure is to provide a basin faucet with filter which has a simple structure, easily replaceable filter core, and more stable installation, so as to address the issues raised in the background.

In order to achieve the above objectives, the present disclosure provides the following technical solutions. A basin faucet with filter, includes:
a faucet tube base, wherein the faucet tube base is provided with a water outlet channel and a switch mechanism for controlling a conduction state of the water outlet channel;
a faucet cover, wherein the faucet cover is detachably arranged on the faucet tube base, a side of the faucet cover located inside the faucet tube base is provided with an annular engaging groove, and a center surrounding by the annular engaging groove forms a water passing hole in communication with the water outlet channel; and
a filtering device, wherein the filtering device is detachably arranged on the faucet cover and is located between the switch mechanism and the water outlet channel, the filtering device includes a tubular filter core and a sealing member matching with an open end of the tubular filter core, two ends of the tubular filter core are respectively fixed with the annular engaging groove and the sealing member.

Further, the faucet cover includes a connecting part, a water outlet cavity and an end cover part which are successively arranged, the connecting part is detachably installed inside the faucet tube base, and the annular engaging groove and the water passing hole are arranged on the connecting part, water flows through the water passing hole to the water outlet cavity, the water outlet cavity is in communication with the water outlet channel, and the end cover part is oriented toward the outside of the faucet tube base.

Further, multiple engaging blocks are arranged on a sidewall of the connecting part at intervals, and an inner wall of an open end of the faucet tube base is provided with engaging grooves matching with the engaging blocks, when the engaging blocks are engaged with the engaging grooves, the faucet cover is fixed with the faucet tube base.

Further, a side of the end cover part away from the connecting part is provided with a non-circular operating slot.

Further, the sealing member is provided with a sealing part matching with the open end of the tubular filter core and an annular support part extending horizontally along an outer edge of the sealing part, when the sealing part is inserted into a tubular cavity of the tubular filter core, the annular support part is attached with an end surface of the tubular filter core.

Further, a sidewall of the sealing part is provided with a plurality of annular protrusions.

Further, the sealing part is a cylindrical recess matching with the tubular cavity of the tubular filter core, during installation, a sidewall of the cylindrical recess is inserted in the tubular cavity of the tubular filter core, and a bottom surface of the cylindrical recess is located in the tubular cavity of the tubular filter core.

Further, the filter core includes a PP cotton layer, a filtering material layer and a non-woven fabric layer which arranged in sequence from outside to inside, and the filtering material layer includes KDF filter media and carbon fiber.

Compared with the prior art, the present disclosure has the following advantages.

According to the present disclosure, a faucet cover is detachably arranged at an opening of an upper part of the faucet tube base, and the filtering device is installed under the faucet cover. When in use, the faucet cover is fixed on the faucet tube base, so that the filtering device is located inside the inner tubular cavity of the faucet tube base and the filtering device is located between the water outlet channel and the switch mechanism. The water flows through the filtering device to be filtered and then flows out from the water outlet channel. During replacement, user only needs to disassemble the faucet cover to take out the filtering device for replacement, so the operation is quick and convenient.

Further, the filtering device includes a tubular filter core and a sealing member. The faucet cover is provided with an annular engaging groove matching with the end of the tubular filter core. During installation, one end of the tubular filter core is engaged with the annular engaging groove, the other end of the tubular filter core is fixed by the sealing member. When in use, the tubular filter core is fixed on the faucet cover by the annular engaging groove, and the rising water flow applies an upward pressure on the sealing member, so the tubular filter core is pushed to and fixed on the faucet cover and the structure stability is improved. According to the present disclosure, the filtering device is stably fixed on the faucet cover through a simple engagement structure, which not only ensures the stability of installation, but also makes the assembling and disassembling of the filter core simpler and faster.

BRIEF DESCRIPTION OF THE DRAWINGS

In order to clearly explain the technical solution of the embodiments of the present disclosure, the drawings that would be used for illustrating the embodiments will briefly introduced below. It should be understood that the drawings illustrated below merely include some of the embodiments of the present disclosure, which are not intended to limit the scope of the present disclosure. For those of ordinary skill in the art, other drawings may be derived based on these drawings without creative effort.

Figure 1:
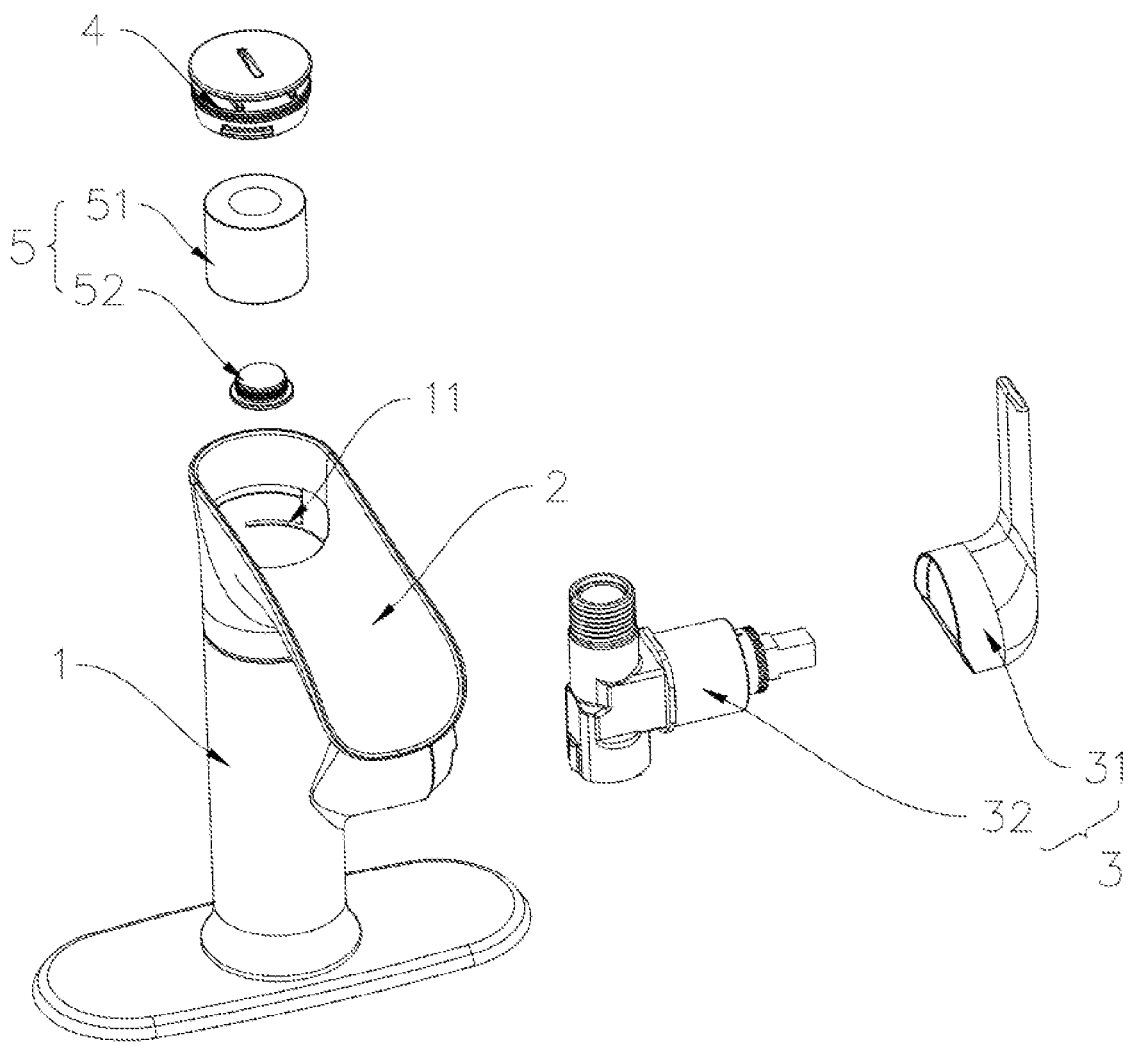
FIG. 1 is an exploded view of an embodiment of the present disclosure.

Reference numerals in the drawings are listed below:
1. faucet tube base;
11. engaging groove;
2. water outlet channel;
3. switch mechanism;
31. operating handle; 32. water flow control valve;
4. faucet cover;
41. annular engaging groove; 42. water passing hole; 43. connection part; 44. water outlet cavity; 45. end cover part; 46. engaging block; 451. operating slot;
5. filtering device;
51. tubular filter core; 52. sealing member; 521. sealing part; 522. annular support part; 523. annular protrusion part.

DETAILED DESCRIPTION OF THE EMBODIMENTS

In order to clarify the objectives, technical solutions and advantages of the embodiments of the present disclosure, the technical solutions in the embodiments of the present disclosure will be clearly and completely described below in conjunction with the accompanying drawings. Obviously, the embodiments described below are not exhaustive, other embodiments not mentioned may also fall within the scope of the present disclosure. Based on the embodiments of the present disclosure, all other embodiments derived by those of ordinary skill in the art without putting into creative efforts should be considered as falling within the scope of the present disclosure. Accordingly, the detailed description of the embodiments of the present disclosure illustrated in the drawings is not intended to limit the scope of the disclosure as claimed. Rather, the detailed description and drawings are intended to represent selected embodiments of the present disclosure.

In the description of the present disclosure, the terms "first" and "second" are merely used for descriptive purpose. These terms cannot be understood as indicating or implying relative importance or implying the quantity of the technical features referred to. Thus, a feature limited by "first" or "second" may expressly or implicitly indicate that one or more of that feature may be included. In the context of the present disclosure, "plurality" means two or more, unless otherwise expressly and specifically defined.

Figure 2:
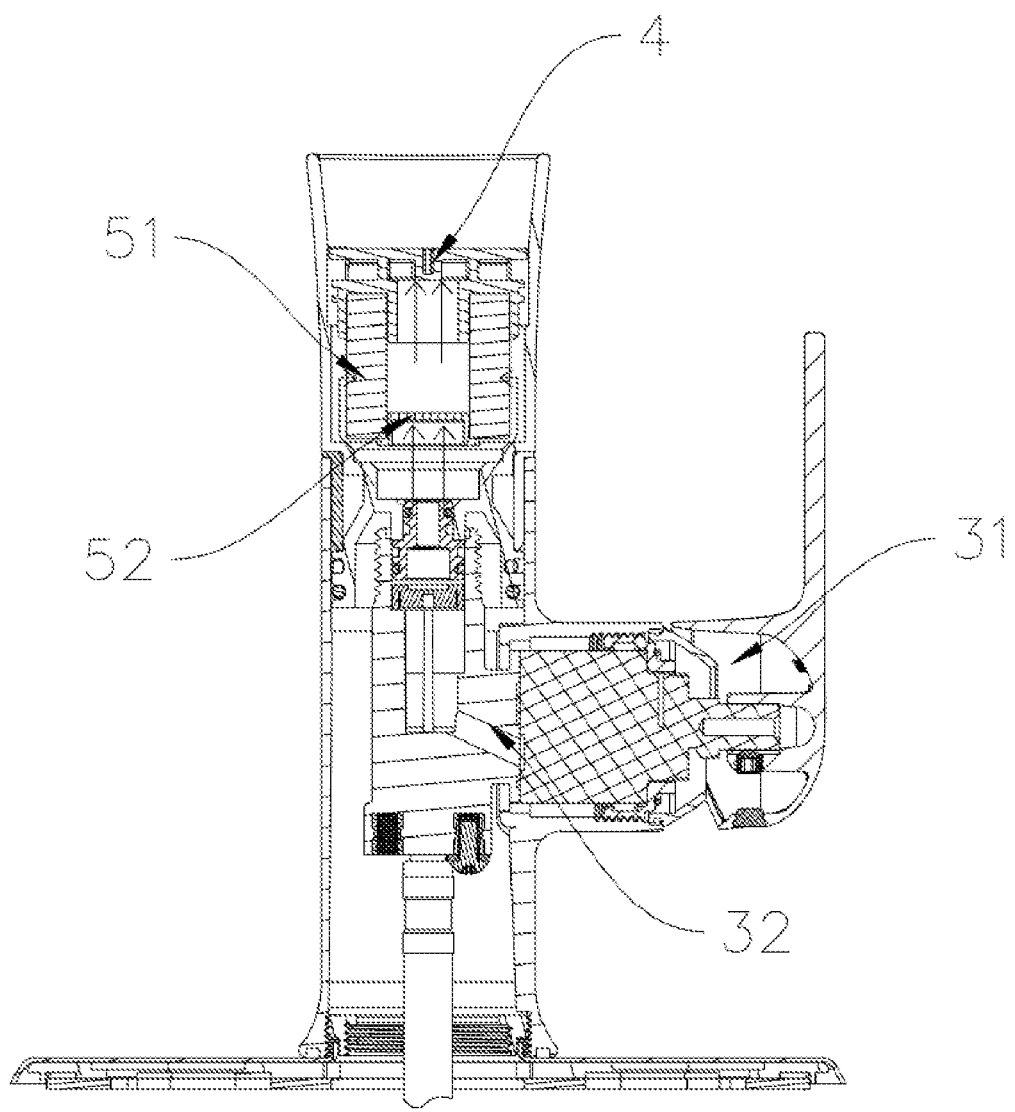
FIG. 2 is a cross-sectional view of an embodiment of the present disclosure.
Figure 3:
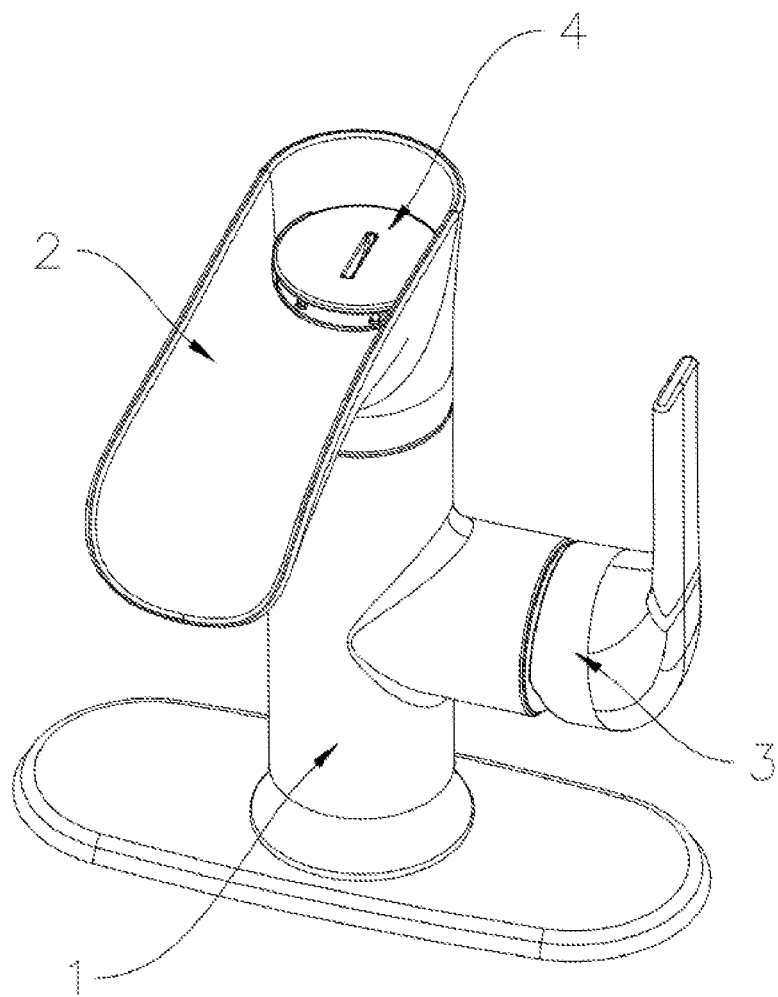
FIG. 3 is a schematic diagram showing an installation structure of an embodiment of the present disclosure.
Figure 4:
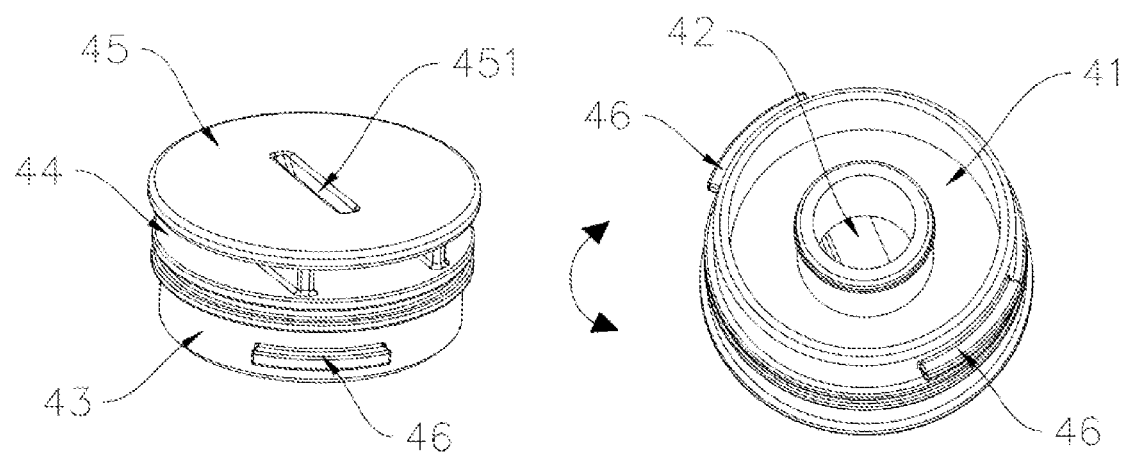
FIG. 4 is a schematic diagram showing the structure of a faucet cover according to an embodiment of the present disclosure.
Figure 5:
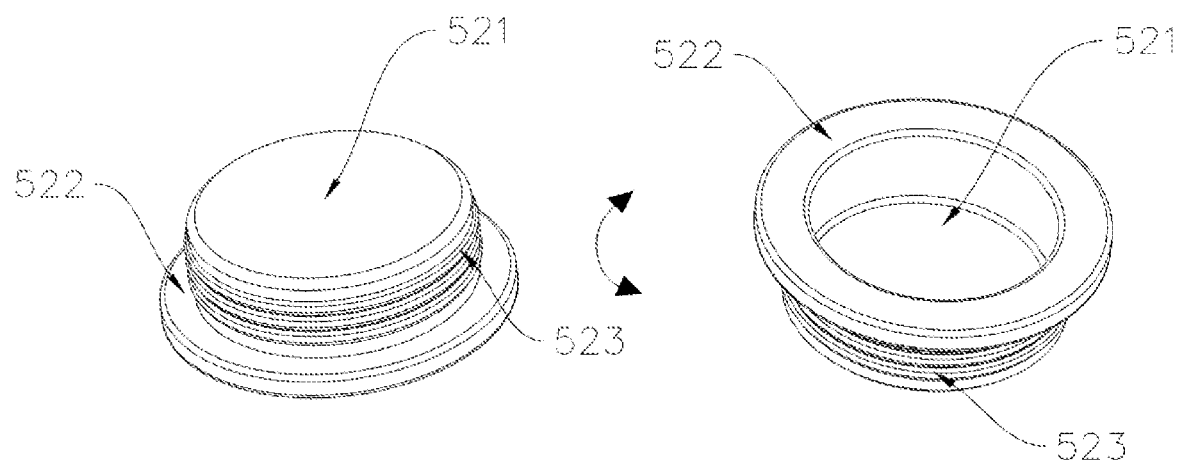
FIG. 5 is a schematic diagram showing a structure of a sealing member according to an embodiment of the present disclosure.

Referring to FIGS. 1-5, a basin faucet with filter is provided, which includes: a faucet tube base 1, faucet cover 4, and a filtering device 5. The faucet tube base 1 is provided with a water outlet channel 2 and a switch mechanism 3 for controlling a conduction state of the water outlet channel 2. The faucet cover 4 is detachably arranged on the faucet tube base 1, a side of the faucet cover 4 located inside the faucet tube base 1 is provided with an annular engaging groove 41, and a center surrounding by the annular engaging groove forms a water passing hole 42 in communication with the water outlet channel 2. The filtering device 5 is detachably arranged on the faucet cover 4 and is located between the switch mechanism 3 and the water outlet channel 2. The filtering device 5 includes a tubular filter core 51 and a sealing member 52 matching with an open end of the tubular filter core 51, and two ends of the tubular filter core 51 are respectively fixed with the annular engaging groove 41 and the sealing member 52.

Specifically, the faucet cover 4 includes a connecting part 43, a water outlet cavity 44 and an end cover part which are successively arranged, the connecting part 43 is detachably installed inside the faucet tube base 1 to fix the faucet cover 4 with the faucet tube base 1. The annular engaging groove 41 and the water passing hole 42 are arranged on the connecting part 43, the water passing hole 42 is located at the center surrounding by the annular engaging groove 41, and the water outlet cavity 44 is in communication with the water outlet channel 2. When the faucet is successfully installed, the water outlet cavity 44 is connected with the water outlet channel 2, and the end cover part 45 is oriented toward the outside of the faucet tube base 1. When in use, water successively flows by the water passing hole 42, the water outlet cavity 44, and flows out from the water outlet channel 2.

According to the present embodiment, multiple engaging blocks 46 are arranged on a sidewall of the connecting part 43 at intervals, and an inner wall of an opening of the faucet tube base 1 is provided with engaging grooves 11 matching with the engaging blocks 46. During installation, the engaging blocks 46 are turned to the intervals between the engaging grooves 11, and the faucet cover 4 is put down in the faucet tube base 1 for a predetermined height, then the faucet cover 4 is rotated until the engaging blocks 46 are engaged with the engaging grooves 11, such that the faucet cover 4 is fixed with the faucet tube base 1. The method for fixing the faucet cover with the faucet tube base of the present embodiment is not limited to the above-mentioned engagement structure, and other engagement structures that can realize fixation and detachment of the faucet cover, such as screw connection and insertion connection etc., are acceptable.

Further, a side of the end cover part 45 away from the connecting part 43 is provided with a non-circular operating slot 451. According to the present embodiment, the operating slot 451 is a linear slot which allows the use of a tool such as a screwdriver or a coin with a similar shape to fasten the faucet cover 4. The faucet cover 4 can be driven to rotate by the tool, so as to realize quick disassembly and installation.

According to the present embodiment, the sealing member 52 is provided with a sealing part 521 matching with the open end of the tubular filter core 51 and an annular support part 522 extending horizontally along an outer edge of the sealing part 521. Specifically, the sealing part 521 may be a cylindrical recess matching with the tubular cavity of the tubular filter core 51, and an edge of an opening of the cylindrical recess is provided with the annular support part 522 which extends outward horizontally. During installation, the sidewall of the cylindrical recess is inserted into a tubular cavity of the tubular filter core 51, so that the bottom wall of the cylindrical recess is located in the tubular cavity of the tubular filter core 51. When the sealing part 521 is inserted into the tubular cavity of the tubular filter core 51, the annular support part 522 is attached with an end surface of the tubular filter core 51.

In use, the sealing member 52 is inserted in the tubular filter core 51 to seal one end of the tubular filter core 51, and water flows through the sidewall of the tubular filter core 51 into a water cavity formed by the sealing member 52 and the tubular filter core 51 and flows out from the water passing hole 41. With the arrangement of the sealing member 52, a pressure-bearing surface is embedded in the cavity of the filter core at the end of the tubular filter core 51 directly facing the impact of the water flow, and the water flow exerts an upward pressure on the pressure-bearing surface, such that the tubular filter core 51 is pushed to be tightly connected with the annular engaging groove 41. Accordingly, the connection stability is improved with a simple structure which is convenient for processing, installation and replacement. Meanwhile, since the sealing part 521 has a shape of cylindrical recess and the sidewall of the cylindrical recess is inserted into the cavity of the tubular filter core, the largest pressure-bearing surface is actually located inside the cavity of the tubular filter core, and the sidewall of the cylindrical recess and the inner cavity of the tubular filter core both undergo compression which contributes to a firmer connection between the sealing member 52 and the tubular filter core 51, so as to avoid undesired detachment of the sealing member and enhance the installation stability.

Preferably, a sidewall of the sealing part 521 is provided with a plurality of annular protrusions to enhance the compression and sealing effect between the sealing part 521 and the tubular filter core 51.

Preferably, the filter core includes a PP cotton layer, a filtering material layer and a non-woven fabric layer which arranged in sequence from outside to inside, and the filtering material layer includes KDF filter media and carbon fiber. Compared with the traditional filter core, four layers of filtration of the present embodiment can effectively improve the filtration effect, not only impurities such as sediment, turbidity and rust can be filtered out, but also heavy metals and acid ions in the water can be filtered out, so as to improve the effect of water treatment.

According to the present embodiment, the switch mechanism 3 includes an operating handle 31 and a water flow control valve 32 connected to the operating handle 31. The water flow control valve 32 can be controlled by operating the handle 31 with different rotation angles and opening degrees, so as to control the water outlet state of the water outlet channel 2.

The above descriptions merely include some of the preferred embodiments of the present disclosure, and are not intended to limit the scope of the present disclosure. For those skilled in the art, the present disclosure may have various modifications and changes. Any modification, equivalent substitution, improvement, and so on that are made without departing from the spirit and principle of the present disclosure should be considered as falling within the scope of the present disclosure.

What is claimed is:

1. A basin faucet with filter, comprising:
   a faucet tube base, wherein the faucet tube base is provided with a water outlet channel and a switch mechanism for controlling a conduction state of the water outlet channel;
   a faucet cover, wherein the faucet cover is detachably arranged on the faucet tube base, a side of the faucet cover is provided with an annular engaging groove, and a center surrounding by the annular engaging groove forms a water passing hole in communication with the water outlet channel, a top end of the faucet cover is located at an upper outer side of the faucet tube base; and
   a filtering device, wherein the filtering device is detachably arranged on the faucet cover and is located between the switch mechanism and the water outlet channel, the filtering device comprises a tubular filter core and a sealing member matching with an open end of the tubular filter core, two ends of the tubular filter core are respectively fixed with the annular engaging groove and the sealing member.

2. The basin faucet with filter according to claim 1, wherein
   the faucet cover comprises a connecting part, a water outlet cavity and an end cover part which are successively arranged, the connecting part is detachably installed inside the faucet tube base, and the annular engaging groove and the water passing hole are arranged on the connecting part, water flows through the water passing hole to the water outlet cavity, the water outlet cavity is in communication with the water outlet channel, and the end cover part is oriented toward the outside of the faucet tube base.

3. The basin faucet with filter according to claim 2, wherein
   multiple engaging blocks are arranged on a sidewall of the connecting part at intervals, and an inner wall of an open end of the faucet tube base is provided with engaging grooves matching with the engaging blocks, when the engaging blocks are engaged with the engaging grooves, the faucet cover is fixed with the faucet tube base.

4. The basin faucet with filter according to claim 3, wherein
   a side of the end cover part away from the connecting part is provided with a non-circular operating slot.

5. The basin faucet with filter according to claim 1, wherein
   the sealing member is provided with a sealing part matching with a tubular cavity of the tubular filter core and an annular support part extending horizontally along an outer edge of the sealing part, when the sealing part is inserted into the tubular cavity of the tubular filter core, the annular support part is attached with an end surface of the tubular filter core.

6. The basin faucet with filter according to claim 5, wherein a sidewall of the sealing part is provided with a plurality of annular protrusions.

7. The basin faucet with filter according to claim 5, wherein
   the sealing part is a cylindrical recess matching with the tubular cavity of the tubular filter core, during installation, a sidewall of the cylindrical recess is inserted in the tubular cavity of the tubular filter core, and a bottom surface of the cylindrical recess is located in the tubular cavity of the tubular filter core.

8. The basin faucet with filter according to claim 1, wherein
the filter core includes a PP cotton layer, a filtering material layer and a non-woven fabric layer which arranged in sequence from outside to inside, and the filtering material layer comprises KDF filter media and carbon fiber.

\* \* \* \* \*